United States Patent [19]

Suzuki et al.

[11] 4,118,716
[45] Oct. 3, 1978

[54] PHOTOGRAPHIC MODE SELECTION DEVICE FOR A CAMERA

[75] Inventors: Masayuki Suzuki, Tokyo; Nobuaki Sakurada; Tadashi Ito, both of Yokohama; Masayoshi Yamamichi, Kawasaki; Hiroyashu Murakami, Tokyo, all of Japan

[73] Assignee: Canon Kabushiki Kaisha, Tokyo, Japan

[21] Appl. No.: 781,347

[22] Filed: Mar. 25, 1977

[30] Foreign Application Priority Data

Mar. 31, 1976 [JP] Japan .................................. 51-35738

[51] Int. Cl.² .................. G03B 7/08; G03B 17/00; G01D 13/00
[52] U.S. Cl. .................................... 354/38; 354/289; 116/114 J
[58] Field of Search ............... 354/23 R, 23 D, 36–39, 354/60 R, 60 E, 60 L, 53, 202, 288, 289, 354, 40, 43, 44, 47, 50, 51; 200/52 R, 61.58 R, 308; 116/114 J, 124 L

[56] References Cited

U.S. PATENT DOCUMENTS

| | | | |
|---|---|---|---|
| 3,601,023 | 8/1971 | Iida | 354/43 |
| 3,820,147 | 6/1974 | Feindler et al. | 354/288 |
| 3,946,408 | 3/1976 | Taguchi | 354/60 R X |
| 3,950,767 | 4/1976 | Matsui | 354/53 X |
| 3,982,254 | 9/1976 | Ito et al. | 354/23 D |
| 4,011,569 | 3/1977 | Mashimo et al. | 354/36 X |

*Primary Examiner*—L. T. Hix
*Assistant Examiner*—William B. Perkey
*Attorney, Agent, or Firm*—Toren, McGeady and Stanger

[57] ABSTRACT

A photographing mode selection device for a camera permitting selection of either a shutter speed preference photographing mode or a lens stop preference photographing mode as desired. To ensure excellent operability for photographing mode selection, the device has a swing lever provided coaxially with a shutter release button or a slide lever which is provided at a position close to the release button in such a way as to permit quick operation with a thumb.

9 Claims, 8 Drawing Figures

PHOTOGRAPHIC MODE SELECTION DEVICE FOR A CAMERA

BACKGROUND OF THE INVENTION

1. Field of the Invention

This invention relates to a photographing mode selection device for a camera and, more particularly, to a photographing mode selection device applicable to a camera having an automatic exposure control device of the type called a shutter speed preference exposure control device which automatically controls the aperture of a photographing lens according to a preset shutter speed value to permit a shutter speed preference photographing operation and another automatic exposure control device of the type called a lens stop preference exposure control device which automatically controls the shutter speed of the camera according to a preset value of lens stop. (The camera of this type hereinafter will be called a double preference mode camera.)

2. Description of the Prior Art

Using such a double preference mode camera, a photographer usually selects one of the two photographing modes prior to photographing. However, during preparation for photographing or while reading out a shutter speed or stop value which has been computed for correct exposure after a shutter release button is depressed, it is sometimes desirable to promptly change the selected photographing mode to the other mode in response to an unexpected sudden change of the scene.

However, in a double preference (or priority) mode camera of the conventionally known type, a photographing mode switching member is disposed on the periphery of a film wind-up lever. With the conventional double preference mode camera, therefore, the photographer must detach a finger from a shutter release button for shifting from one photographing mode to the other and thus it is impossible to quickly make such shifting. This has been a shortcoming of the conventional type double preference mode camera.

SUMMARY OF THE INVENTION

An object of this invention is to provide a photographing mode selection device of excellent operability which permits quick shifting from one photographing mode to the other.

Another object of this invention is to provide a photographing mode selection device which permits shifting from one photographing mode to the other even when a shutter release button is in a state of being depressed.

Still another object of this invention is to provide a double preference mode camera which has a photographing mode selection device of excellent operability.

A further object of this invention is to provide a photographing mode selection device which is interlocked with an indication shifting member of a mechanical indicator.

These and other objects, features and advantages of this invention will become apparent from the following detailed description of preferred embodiments taken in connection with the accompanying drawings.

DESCRIPTION OF THE PREFERRED EMBODIMENTS

Figure 1:
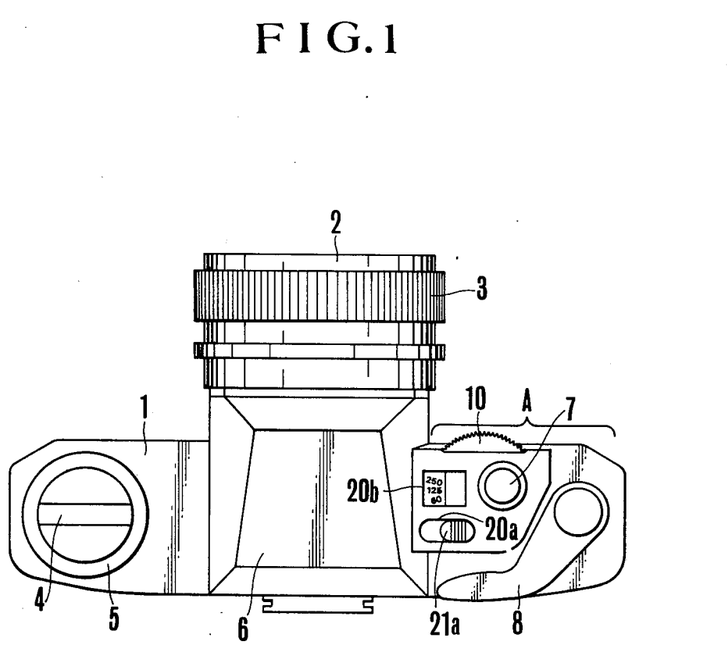
FIG. 1 is a plan view illustrating a double preference mode camera employing a photographing mode selection device as an embodiment of this invention.

Referring to the accompanying drawings, the details of this invention are as described below: In FIG. 1 which is a plan view illustrating a double preference mode camera having the photographing mode selection device of this invention incorporated therein, a reference numeral 1 indicates a camera body; 2 indicates a photographing lens; 3 indicates a range adjustment ring disposed on the barrel of the photographing lens 2; 4 indicates a film rewind lever; 5 indicates a film sensitivity setting dial; 6 indicates a pentagonal prism assembly; 7 indicates a shutter release button; and 8 indicates a film wind-up lever. These parts are arranged in the same manner as in an ordinary single-lens reflex camera. A reference symbol A indicates a shutter time and lens stop information setting part which includes the photographing mode selection device of this invention and the structural details of which are illustrated in FIG. 2.

Figure 2:
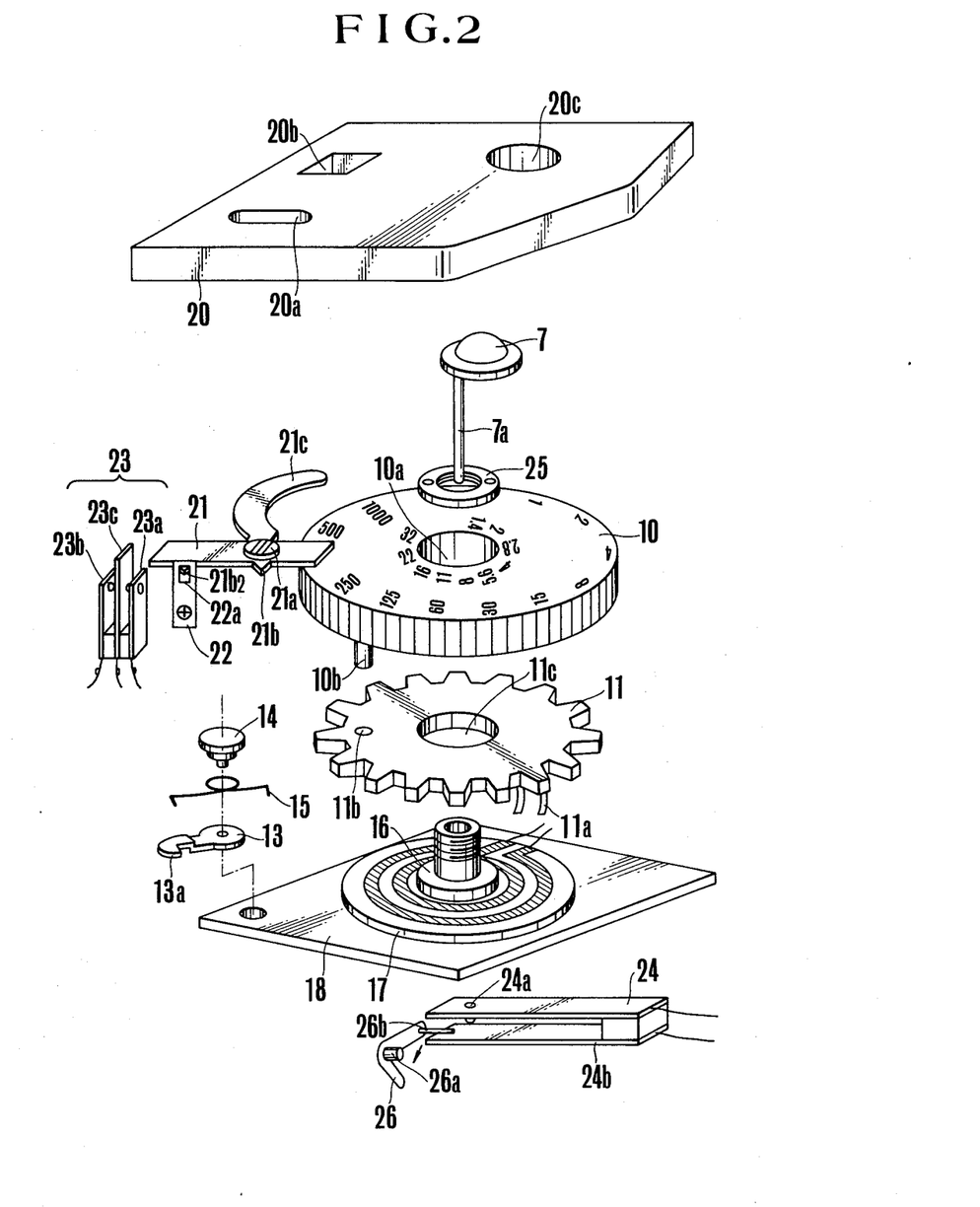
FIG. 2 is an exploded view illustrating the structural details of the photographing mode selection device employed in the camera shown in FIG. 1.

In FIG. 2 which illustrates the details of the photographing information setting part A indicated in FIG. 1, a reference numeral 10 indicates an information setting dial which is formed with a disc-shaped member with the figures of photographing information values arranged in concentric circles. Lens stop values are arranged in the inner circle while shutter time values are arranged in the outer circle. A reference numeral 11 indicates a click plate which is provided with contact pieces 11a. The plate 11 is also provided with an engaging hole 11b. A pin 10b secured to the dial 10 is inserted in the hole 10b. This causes the plate 11 to rotate together with the dial 10 when it is rotated. A reference numeral 13 indicates a click claw which is carried by a pin 14 and is urged by a spring 15 to rotate counterclockwise while the claw portion 13a of the click claw 13 engages with the click plate 11; and 16 indicates a shaft which carries the dial 10 and is secured to a base plate 18 together with a printed board 17. The board 17 serves as a variable resistance which is provided for photographing information input. The board 17 is provided with a pattern which is arranged to be in contact with the contact pieces 11a of the click plate 11 in such a way as to form a variable resistance. The resistance value of the variable resistance corresponds to the value of lens stop or shutter speed or time set at the photographing information dial 10. An upper cover plate 20 which forms a part of the information setting part A is provided with a hole 20a through which a protrusion 21a of a slide lever 21 is inserted for selection of a photographing mode; a window 20b which is located above the figures of the photographing information marked on the dial 10; and a hole 20c through which the shutter release button 7 is inserted. A reference numeral 21 indicates the above stated slide lever which is provided with the contact part or protrusion 21a; a click 21b; and a shielding part 21c which is disposed in such a way as to shield the photographing information. A reference numeral 22 indicates a member which is secured to the camera body with a screw and is provided with a hole to allow the click 21b of the slide lever 21 to be inserted therein; and 23 indicates a photographing mode selection switch provided with fixed contact pieces 23a and 23b and a moving contact piece 23c. The moving contact piece 23c comes in contact with the fixed contact piece 23a as illustrated in FIG. 2 when the shielding part 21c of the slide lever 21 is slided into a position to shield the lens stop value figures marked on the dial 10 and comes in contact with the fixed contact piece 23b when the shielding part 21c is slided into a position of shielding the shutter speed value figures marked on the dial 10. A reference numeral 7 indicates the above stated shutter release button. Although it is not so illustrated, a shaft 7a of the button 7 is inserted through a hole 10a provided in the dial 10, a hole provided in the middle of the click plate 11 and an inserting hole of a shaft 16 to engage with a contact piece 24a of a storage switch 24. A reference numeral 25 indicates a nut which rotatably carries the click plate 11 and dial 10. The protrusion 21a of the slide lever 21 is disposed in a position to permit operation thereof with a thumb while the shutter release button 7 is being depressed, for example, with an index finger.

Figure 4:
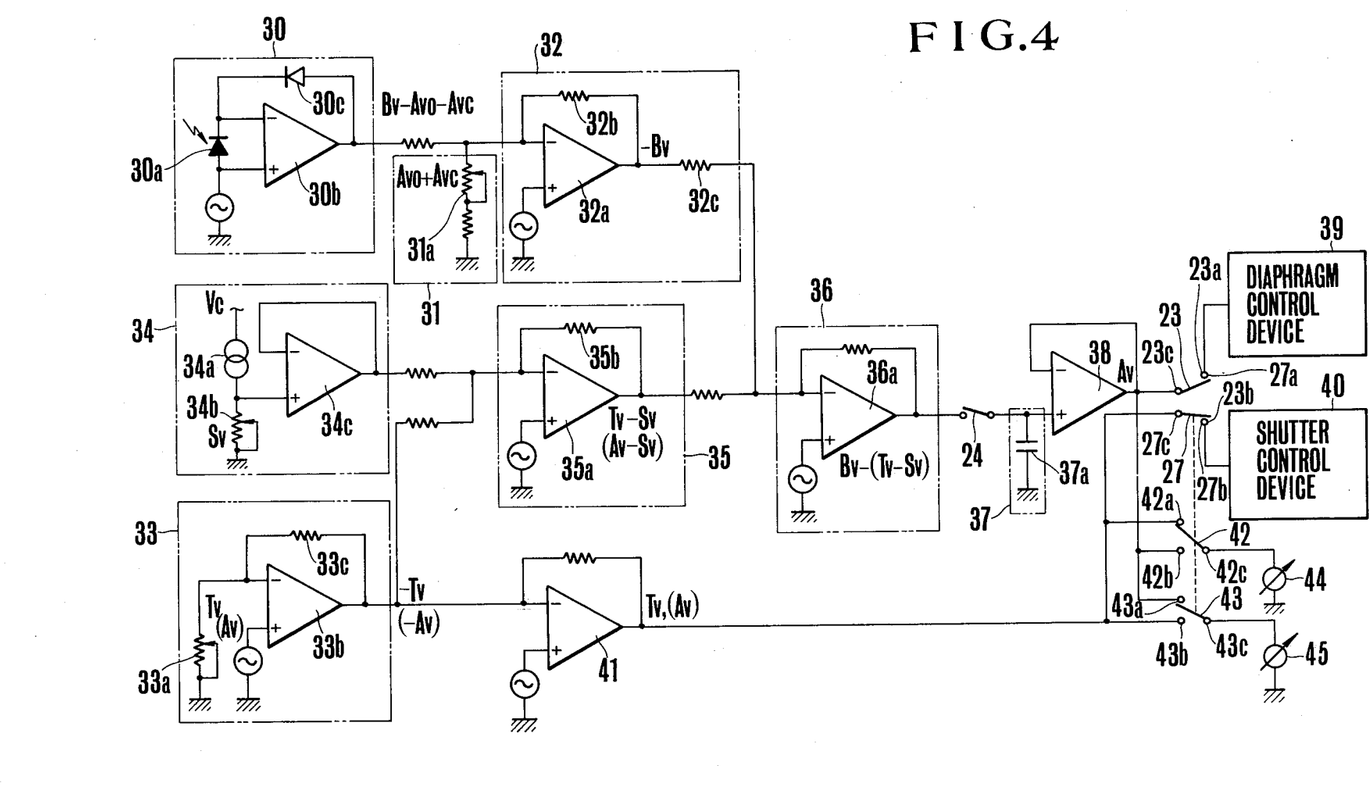
FIG. 4 is a circuit diagram illustrating as an example an automatic exposure control device employed in the camera illustrated in FIG. 1.

Switching elements 21 and 23 in FIG. 2 and element 27 in FIG. 4 define photographic mode changeover means.

Figure 3A:
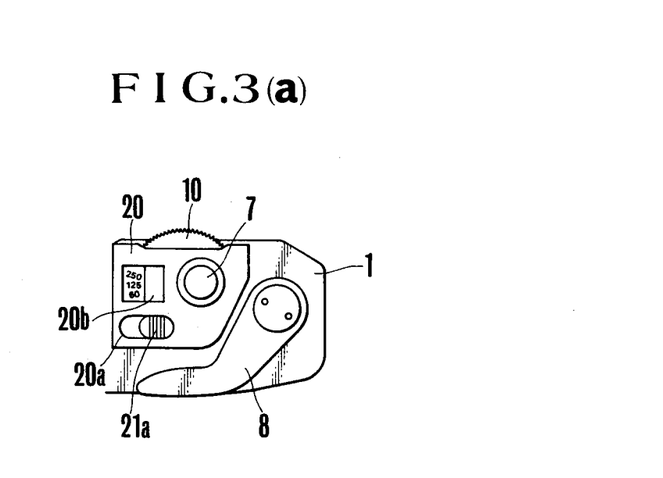
FIGS. 3(a) and (b) are plan views illustrating the photographing mode selection device of the camera shown in FIG. 1, FIG. 3(a) illustrating the selection device as in a state of having selected a shutter speed preference photographing mode and FIG. 3(b) illustrating it as in a state of having selected a lens stop preference photographing mode.
Figure 3B:
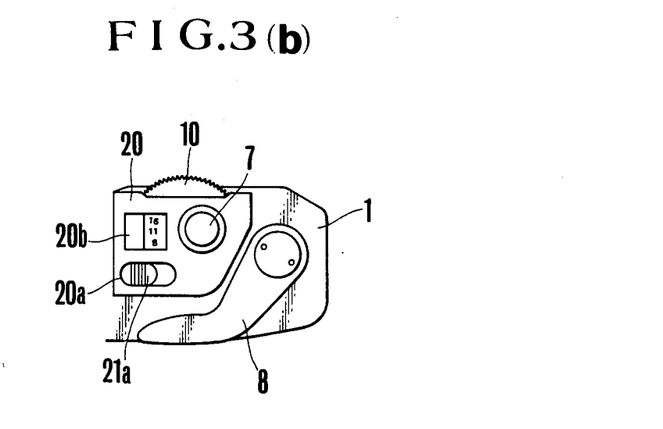

FIGS. 3(a) and (b) are plan views illustrating the photographing information setting part A of the embodiment example illustrated in FIG. 1 and 2. FIG. 3(a) illustrates it as in a state of having selected a shutter time (or speed) preference photographing mode and FIG. 3(b) a state of having selected a lens stop preference photographing mode. The same reference numerals as used in FIGS. 1 and 2 are used for indicating like parts.

FIG. 4 is a circuit diagram illustrating as an example the automatic exposure control device employed in the camera illustrated in FIG. 1. In FIG. 4, a reference numeral 30 indicates a photometric circuit comprising a silicon photocell 30a which receives a quantity of light from a photographing object; an operational amplifier 30b; and a diode 30c which is connected between the input and output terminals of the operational amplifier 30b and which serves to logarithmically suppress a photoelectric current. A reference numeral 31 indicates a compensatory information setting circuit which is provided with a resistance 31a for setting a full-open F number value Avo of the photographing lens and a full-open aperture compensating value Avc; and 32 indicates an addition circuit which is provided with an operational amplifier 32a and a resistance 32b for forming an inverter circuit for a gain 1 and is also provided with a resistance 32c connected to the output terminal of the amplifier 32a. The inversion terminal of the amplifier 32a is connected to the output terminal of the photometric circuit 30 and is also connected to the output terminal of the compensatory information setting circuit 31 while the non-inversion terminal of the amplifier 32 is connected to a bias power source. A reference numeral 33 indicates a Av or Tv setting circuit comprising a variable resistance 33a which is indicated as 17 and 11a in FIG. 2, an operational amplifier 33b and a resistance 33c which is provided for forming an inverter of gain 1; 34 indicates a film sensitivity setting circuit comprising a film sensitivity setting resistance 34b which is connected to a constant current source 34a and an operational amplifier 34c which forms a follower circuit; 35 indicates an addition circuit including a resistance 35b and an operational amplifier forming an inverter circuit of gain 1, the inversion terminal of the amplifier 35a being connected to a photographing information setting circuit, i.e., the output terminals of the film sensitivity setting circuit 34 and the Av or Tv setting circuit 33; 36 indicates an operation circuit formed by an operational amplifier 36a, the inversion input terminal of the amplifier 36a being connected to the output terminals of the addition circuits 32 and 35 respectively; 24 indicates a storage switch indicated in FIG. 2; and 37 indicates a storage circuit having a capacitor 37a which is connected to the storage switch 24 and is also connected to a non-inversion input terminal of an operational amplifier 38 which forms a follower circuit. Meanwhile the output terminal of the operational amplifier 38 is connected to the moving contact piece 23c of the photographing mode selection switch 23 indicated in FIG. 2. The fixed contact piece 23a of the photographing mode selection switch 23 is connected to the input terminal of a diaphragm control means 39 while the other fixed contact piece 23b is connected to the input terminal of a shutter control circuit 40. This circuit controls an exposure time in response to an input signal. A reference numeral 27 indicates a selection switch which is interlocked with the selection switch 23. A moving contact piece 27c of the selection switch 27 is connected to a fixed contact piece 27b of the switch 27 when the moving contact piece 23c is connected to the fixed contact piece 23a and is connected to another fixed contact piece 27a of the switch 27 when the moving contact piece 23c is connected to the other fixed contact piece 23b of the switch 23. A reference numeral 39 indicates the diaphragm control device 39 which defines the stop aperture of an unillustrated stop device provided at the photographing lens 2 (see FIG. 1) in accordance with the exposure factor stored in the storage circuit 37. The details of the diaphragm control device 39 is omitted as the device is known and is similar, for example, to the one disclosed in a patent application filed Aug. 3, 1976 having a U.S. Ser. No. 711,294. A reference numeral 40 indicates the shutter control device which is provided for defining a focal plane shutter opening time in accordance with the exposure factor stored in the storage circuit 37. The detailed description of the shutter control device is also omitted here as it is known and is similar to, for example, the one disclosed in U.S. Pat. No. 3,693,518 (granted Sept. 26, 1972). A reference numeral 41 indicates an operational amplifier forming an inverter circuit, the output terminal of which is connected through selector switches 42 and 43 to exposure factor indication meters 44 and 45 respectively; and 42 indicates the selector switch having a fixed contact piece 42a which is connected to the output terminal of the inverter circuit 41, another fixed contact piece 42b which is connected to the output terminal of the follower circuit 38 and a moving contact piece 42c which is connected to the shutter speed indication meter 44. The selector switch 42 is interlocked with the switch 23 in such a manner that the moving contact piece 42c is connected to the fixed contact piece 42a when the moving contact piece 23c of the switch 23 is connected to the fixed contact piece 23a of the switch 23 and is connected to the fixed contact piece 42b reversely to the illustrated state when the moving contact piece 23c is connected to the other fixed contact piece 42b reverse to the state illustrated in FIG. 4. A reference numeral 43 indicates another selector switch having a fixed contact piece 43a which is connected to the output terminal of the follower circuit 38, another fixed contact piece 43b which is connected to the output terminal of the inverter circuit 41 and a moving contact piece 43c which is connected to the lens stop value indication meter 45. The selector switch 43 is interlocked with the switch 23. The moving contact piece 43c of the switch 43 is connected to the fixed contact piece 43a, when the switch 23 is in a state of connection as illustrated, and is connected to the fixed contact piece 43b when the moving contact piece 23c is connected reversely to the illustrated state. Referring now to FIG. 1 through 4, the operation of the double preference mode camera is described below:

First, the operation of the camera in a shutter speed preference photographing mode is described. The photographing mode shifting slide lever 21 is slid to the right until the click 21b thereof comes to fall in the hole 22a provided in the member 22. With the slide lever 21 slided as mentioned above, the shielding plate 21c of the lever 21 covers the stop value figures marked on the dial 10 (1.4–32 according to illustration provided in FIG. 2). Therefore, in the window 20b of the upper cover plate, there appears shutter speed value figures which are marked also on the dial 10. On the other hand, since the moving contact piece 23c of the photographing mode selection switch 23 is then connected to the fixed contact piece 23a, the output terminal of the follower circuit 38 indicated in FIG. 4 is connected to the diaphragm control device 39. Then, the photographing information setting dial 10 is turned until a figure representing a desired shutter speed appears in the window 20b of the upper cover plate 20. With the desired shutter speed value having been set at the dial 10 in this manner, the desired shutter speed is also set at the resistance 33a (see FIG. 4) by the rotation of the dial 10. The shutter speed value Tv set at the resistance 33a is added at the addition circuit 35 to a film speed value (or sensitivity value) Sv which is set at the resistance 34b of the film sensitivity setting circuit 34. The result Tv-Sv of the addition performed at the addition circuit 35 is then impressed upon the input terminal of the operation circuit 36. Meanwhile, information Bv corresponding to the brightness of the photographing object is supplied by the addition circuit 32 to the input terminal of the operation circuit 36. The two input signals of information thus obtained are computed at the operation circuit 36. Upon completion of the computation, a voltage corresponding to a lens stop value Av required for correct exposure is produced from the output terminal of the operation circuit 36. The output signal thus produced at the operation circuit 36 is stored in the capacitor 37a through the storage switch 24. During the above stated processes of operation, the shutter release button is kept depressed by a finger of the photographer for the purpose of supplying each electrical circuit with power. However, if it is desired to shift the shutter speed preference photographing mode to the lens stop preference photographing mode at this stage of operation, the slide lever 21 is slided to the left with a finger, a thumb for example, other than the finger depressing the shutter release button while the shutter release button is still kept depressed. The sliding of the slide lever 21 causes the moving contact piece 23c of the photographing mode selection switch 23 to be switched to the fixed contact piece 23b. This in turn causes the output terminal of the follower circuit 38 shown in FIG. 4 to be connected to the shutter control device 40. Further, the shielding plate 21c of the slide lever 21 also moves to the left into a position above the shutter speed markings on the dial 10 (1–1000 as illustrated in FIG. 2). Therefore, in the window 20b of the upper cover plate 20, there appear the stop value indications marked on the dial 10. Since, in place of the set shutter speed, a lens stop value Av is set at the resistance 33a shown in FIG. 4, a shutter speed value Tv required for making correct exposure is stored in the storage circuit 37. In accordance with the above described embodiment example, shifting from one photographing mode to the other mode can be quickly accomplished without detaching a finger from the shutter release button. This is an advantage for a camera of this type.

Upon completion of storing of the exposure factor, exposure adjustment based on the stored information is accomplished in the following manner:

The shutter release button 7 is depressed further downward. By this, an unillustrated mirror is lifted. In response to this, the lever 26 shown in FIG. 2 rotates clockwise on the shaft 26a. As a result of this, the switch 24 which engages with the pin 26b of the lever 26 moves downward and comes into an opened state. Then, the exposure factor which has been stored in the capacitor 37a is memorized in the capacitor 37a. Further, assuming that the camera is controlled in the shutter speed preference photographing mode, when the information on the lens stop value Av is stored in the capacitor 37a as described in the foregoing, the diaphragm control device 39 defines the diaphragm aperture of the photographing lens in accordance with the information. On the other hand, since a shutter speed value signal Tv has been impressed through the switch 27 upon the input terminal of the shutter control device 40, the shutter opening time is controlled, after lifting of the mirror, in accordance with the set shutter speed value Tv, so that exposure can be made to a correct degree.

Next, control of the camera in the lens stop preference photographing mode is performed in the following manner: The slide lever 21 is slided to the left. The moving contact piece 23c is then connected to the fixed contact piece 23b. The output terminal of the follower circuit 38 which has been connected to the diaphragm control device 39 is now connected to the shutter control device 40. The moving contact piece 27c of the selector switch 27 which has been connected to the fixed contact piece 27b is also shifted to the other fixed contact piece 27a. The shielding plate 21c of the slide lever 21 moves to a position above the shutter speed markings on the dial 10 to cover them. Therefore, in the window 20b of the upper cover plate 20, there appear the stop value markings provided on the dial 10. When a desired stop value is set at the dial 10, the stop value set at the dial 10 is also set at the resistance 33a. By this, a shutter speed value Tv required for correct exposure is stored in the storage capacitor 37a. After that, when the shutter release button 7 is depressed, diaphragm control device controls the stop aperture of the photographing lens according to the stop value information Av received from the inverter circuit 41 through the switch 27. At the same time, the shutter control device 40 controls the opening time of the unillustrated shutter in accordance with the shutter speed information stored in the storage capacitor 37a, so that exposure can be made to a correct degree.

In this photographing mode, the mode can be also quickly shifted to the other mode by just sliding the slide lever 21, for example, with a thumb.

Figure 5A:
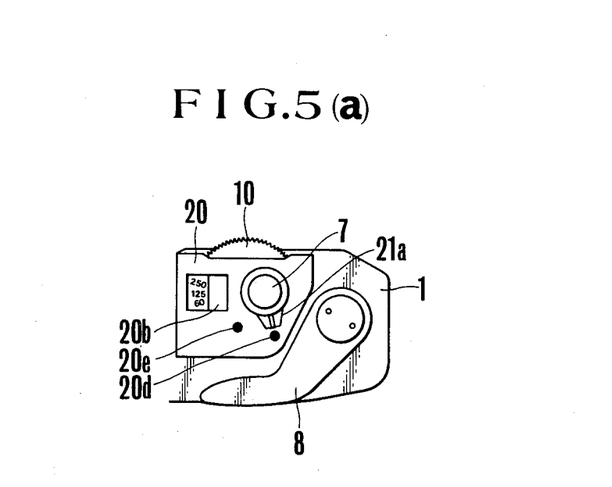
FIG. 5(a) and (b) are plan views illustrating, as a second embodiment example of this invention, another photographing mode selection device also usable for the camera illustrated in FIG. 1, FIG. 5(a) illustrating the mode selection device as in a state of having selected a shutter speed preference photographing mode and FIG. 5(b) illustrating it as in a state of having selected a lens stop preference photographing mode.
Figure 5B:
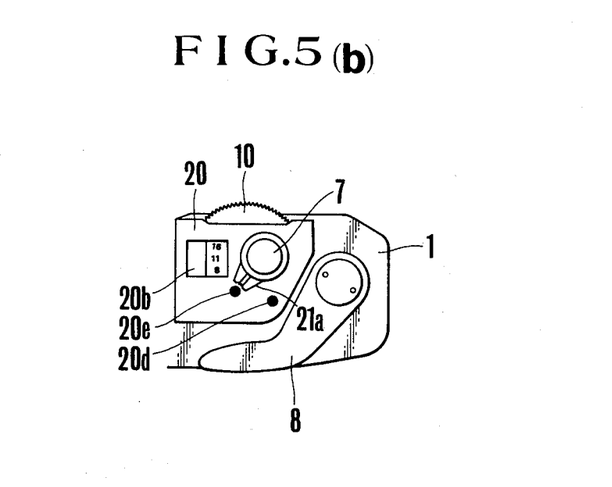
Figure 6:
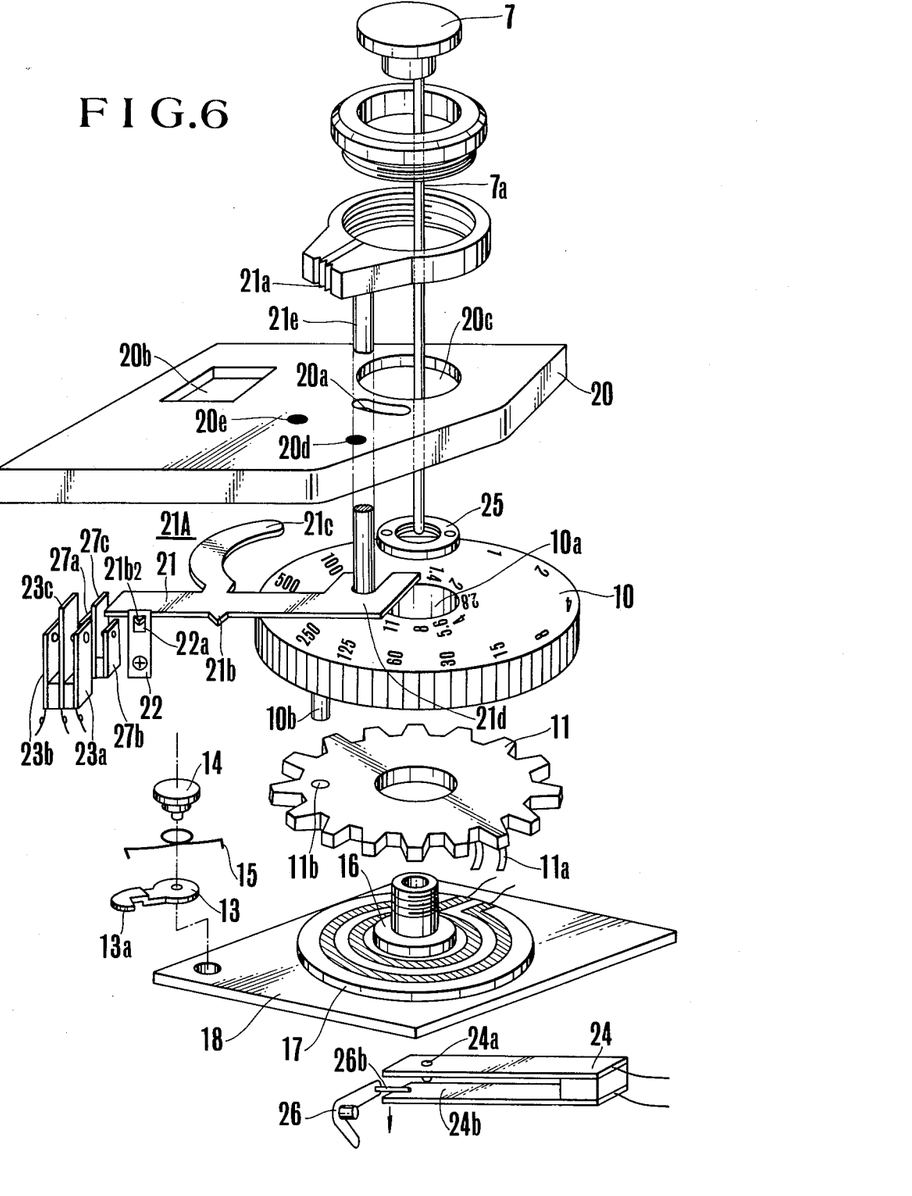
FIG. 6 is an exploded view illustrating the structural details of the second embodiment example of the photographing mode selection device illustrated in FIGS. 5(a) and (b).

FIG. 5(a), FIG. 5(b) and FIG. 6 illustrate a photographing information setting part which includes another photographing mode selection device as another embodiment example of this invention. In these drawings, the same reference numerals as those used in FIG. 1 through 4 are used for indicating like parts.

FIG. 5(a) illustrates the photographing information setting part as in a state of having selected a shutter speed preference photographing mode while FIG. 5(b) illustrates it as in a state of having selected a lens stop preference photographing mode. In FIG. 5(a) and (b), reference numeral 1 indicates a camera body; 7 indicates a shutter release button; 8 indicates a film wind-up lever; 10 indicates an information setting dial; 20 indicates an upper cover plate; 20b indicates a window provided in the upper cover plate 20; 20d indicates an index mark provided for indicating a shutter speed preference mode selecting point; and 20e another index mark which indicates a stop preference photographing mode selecting point.

FIG. 6 is an exploded view illustrating the structural details of the second embodiment example of the information setting part illustrated in FIG. 5(a) and (b). In FIG. 6, a reference numeral 7 indicates a shutter release button, 7a indicates a shaft attached to the release button; 20 indicates an upper cover plate which is provided with a hole 20a, a window 20b, a hole 20c and index marks 20d and 20e; 21A indicates a photographing mode shifting member comprising a swing lever 21a which is disposed on the periphery of the shutter release button 7 to be freely rotatable there, a pin 21e which is attached to the lever 21a and is inserted in a forked part 21d of the slide lever 21, a shielding plate 21c and a click 21b; 10 indicates an information setting dial having a pin 10b; 25 indicates a nut; 23 and 27 indicate photographing mode selector switches; 11 indicates a click plate having a contact piece 11a and an engaging hole 11b; 17 indicates a printed board; 18 indicates a base plate; 24 indicates a storage switch having contact pieces 24a and 24b; 26 indicates a lever; 14 indicates a pin; 15 indicates a spring; and 13 indicates a click claw.

The photographing information setting part which is arranged as described in the foregoing differs from that photographing information setting part illustrated in FIG. 1 through 3 only in the photographing mode shifting members. Therefore, the operation of the photographing information setting part illustrated in FIGS. 5 and 6 is described below covering only the different points while the rest of the operation is omitted from the description. The electrical circuit used in this embodiment example is identical with the circuit which is illustrated in FIG. 4.

In the case of the shutter speed preference photographing mode, the swing lever 21a provided on the periphery of the shutter release button 7 is adjusted to the index mark 20d. With the lever 21a turned counterclockwise, the pin 21e also moves counterclockwise inside the hole 20a. This causes the forked part 21d to move in the right direction. The shielding plate 21c of the slide lever 21 moves to a position wherein it covers the stop value markings provided on the dial 10. Then, in the window 20b, there appear only the shutter speed value figures marked on the dial 10. Since the slide lever 21 moves in the right direction, the moving contact pieces 23c and 27c of the switches 23 and 27 do not come in contact with the slide lever 21 respectively. Therefore, the moving contact piece 23c comes in contact with the fixed contact piece 23a while the moving contact piece 27c comes in contact with the fixing contact piece 27b. The shutter speed value Tv set at the dial 10 is also set at the resistance 33a shown in FIG. 4 in the same manner as described in the embodiment example illustrated in FIG. 1 through 4. Exposure control is then performed in the shutter speed preference photographing mode in accordance with the photographing information set at the resistance 33a in the same manner as in the embodiment illustrated in FIG. 1 through 4.

During preparatory processes for photographing in the shutter speed preference photographing mode, for example, in the stage of depressing the shutter release button 7 by one step just covering the first stroke thereof, if it is desired then to shift the photographing mode to the lens stop preference photographing mode, the swing lever 21a is turned clockwise with, for example, a thumb or an index finger until the position of the lever 21 is adjusted to the index mark 20e while the shutter release button is maintained in the state of being depressed. Then, the pin 21e causes the forked part of the slide lever 21 to move in the left direction. One end of the slide lever 21 comes to push the moving contact pieces 23c and 27c of the switches 23 and 27 in the left direction. By this, the moving contact piece 23c is shifted to the fixed contact piece 23b while the moving contact piece 27c is shifted to the fixed contact piece 27a. After this, exposure control is performed in the stop preference photographing mode in the same manner as in the preceeding embodiment example. Further, for changing the stop preference photographing mode to the shutter speed preference photographing mode, such can be also readily performed by just turning the swing lever 21a with a thumb for example.

As described in detail in the foregoing, in accordance with this invention, the operability of a double preference mode camera can be improved to a great extent to enable a photographer to quickly shift one photographing mode to the other.

What is claimed is:

1. A photographing mode change-over device for a double priority mode camera which is equipped with a shutter release button and which is capable of controlling the degree of exposure either in a shutter speed priority automatic exposure mode or in a diaphragm priority automatic exposure mode as desired by the photographer, said device comprising:

a photographing mode change-over means which is provided on said camera for shifting from one of said photographing modes to the other and is disposed at a position which enables the photographer to operate the change-over means with a finger while he is pressing a shutter release button with another finger of the same hand.

2. A photographing mode change-over device according to claim 1 wherein said photographing mode change-over member includes:

a slide lever having a contact part protruding from a wall, which wall is the same as that on which said shutter release button is disposed, said contact part being arranged so that a photographer can readily actuate the part with said finger.

3. A photographing mode change-over device according to claim 2 wherein said slide lever is arranged to be slidable between a first position in which a shutter speed priority photographing mode is selected and a second position in which a diaphragm priority automatic exposure photographing mode is selected.

4. A photographing mode change-over device according to claim 3 wherein said camera includes a photographing information setting dial, which is provided thereon with a shutter speed scale and an aperture size scale, said scales being arranged in concentric circles.

5. A photographing mode change-over device according to claim 4 wherein said slide lever is provided with a shielding plate which covers said aperture size scale when the slide lever is slid into said first position and covers said shutter speed scale when the slide lever is slid into said second position.

6. A photographing mode change-over device according to claim 2 wherein said slide lever is actuated by a swing lever disposed coaxially with said shutter release button.

7. A photographic camera having a taking lens comprising:

(a) a shutter release button mounted on the camera for initiating the operation of a shutter mechanism of the camera;

(b) a photometric circuit for producing a first electrical signal corresponding to the brightness of an object to be photographed;

(c) a photographic information setting circuit for producing a second electrical signal corresponding to a set exposure parameter;

(d) a calculating circuit connected to the photometric circuit and the photographic information setting circuit for producing a third electrical signal corresponding to the first electrical signal and second electrical signal;

(e) a diaphragm control means for controlling an aperture size of the taking lens in response to an input signal;

(f) a shutter control circuit for controlling an exposure time in response to an input signal;

(g) a photographing mode selecting member for shifting the camera from one automatic exposure mode to another mode, the selecting member being slidable between a first position in which a shutter speed priority automatic exposure mode is selected and a second position in which a diaphragm priority automatic exposure mode is selected, the selecting member being disposed on the camera at a position which readily enables a photographer, during a photographing operation performed using a finger of a hand for operating said shutter release button, to operate the selecting member with one of the remaining fingers of the same hand while the shutter release button is being operated with the former finger; and (h) a switching means associated with the photographing mode selecting member, in which the switching means supplies the third signal from said calculating circuit to said diaphragm control means as an input signal and supplies the second electrical signal from said photographic information setting circuit to said shutter control circuit as an input signal when the selecting member is at the first position, while when the selecting member is at the second position said switching means supplies the third signal from said calculating circuit to said shutter control circuit as an input signal and supplies the second electrical signal from said photographic information setting circuit to said diaphragm control means as an input signal.

8. A camera according to claim 7 wherein said mode selecting means consists of a slide lever having a contact part protruding from a wall, said wall being the same as that on which said shutter release button is disposed, said contact part being arranged so that a photographer can actuate said part with said finger.

9. A camera according to claim 8 wherein said slide lever is actuated by a swing lever disposed coaxially with said shutter release button.